United States Patent
Sankaranaynan et al.

(10) Patent No.: US 8,279,826 B1
(45) Date of Patent: Oct. 2, 2012

(54) PRESENCE BASED ROUTING IN AN IP MULTIMEDIA SUBSYSTEM NETWORK

(75) Inventors: Pallavur Sankaranaynan, Overland Park, KS (US); Lyle Paczkowski, Mission Hills, KS (US); Brian D. Mauer, Shawnee, KS (US); Matthew C. Schlesener, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 829 days.

(21) Appl. No.: 11/780,018

(22) Filed: Jul. 19, 2007

(51) Int. Cl.
  *H04L 5/22* (2006.01)
  *H04W 40/00* (2009.01)
(52) U.S. Cl. ........................................ 370/330; 455/445
(58) Field of Classification Search ............... 455/435.1, 455/410, 419, 445, 417, 416, 414.1, 414.4, 455/436, 560; 370/216, 238, 54, 238.1, 351–352, 370/392, 394; 709/241
  See application file for complete search history.

(56) References Cited

U.S. PATENT DOCUMENTS

| | | | |
|---|---|---|---|
| 5,828,844 A * | 10/1998 | Civanlar et al. | 709/228 |
| 6,754,181 B1 * | 6/2004 | Elliott et al. | 370/252 |
| 6,892,069 B1 * | 5/2005 | Flynn | 455/432.1 |
| 7,280,533 B2 * | 10/2007 | Khartabil et al. | 370/352 |
| 2008/0086564 A1 * | 4/2008 | Putman et al. | 709/227 |
| 2008/0181198 A1 * | 7/2008 | Yasrebi et al. | 370/352 |
| 2010/0008352 A1 * | 1/2010 | Przybysz et al. | 370/352 |

* cited by examiner

*Primary Examiner* — Melody Mehrpour
*Assistant Examiner* — Emem Stephen

(57) ABSTRACT

A method for registration of endpoints within in IP Multimedia Subsystem network is described. One embodiment includes receiving a request from an endpoint to deregister the endpoint. A deregistration routine is initiated to deregister the endpoint within the IP Multimedia Subsystem network. The registration status of the endpoint and any call forwarding data is stored within the IP Multimedia Subsystem network.

15 Claims, 4 Drawing Sheets

| SIP HEADER | REGISTERED | FORWARD NO. |
|---|---|---|
| Sip:1234@555telco.example.net | YES | |
| Sip:4242@555telco.example.net | YES | |
| Sip:5959@555telco.example.net | NO | |
| Sip:6706@555telco.example.net | NO | Sip:4242@555telco.example.net |

PRESENCE BASED ROUTING IN AN IP MULTIMEDIA SUBSYSTEM NETWORK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Typically, within a service provider's IP Multimedia Subsystem (IMS) network, the network is not aware of the registration status of IP endpoints outside of the network. An enterprise, on the other hand, knows the registration status of endpoints within the enterprise, but does not have the capability of sharing this information, using the existing call signaling infrastructure. This limits the service provider to only providing SIP trunking solutions for local and long distance calling with the IMS. That is, the IMS network acknowledges these endpoints as always being registered, thus limiting the network in providing enhanced services like presence based routing to the enterprise and the endpoints therein.

SUMMARY

The present invention is defined by the claims below. Embodiments of the present invention solve at least the above issues by providing a system and method for, among other things, technologies for deregistering endpoints within an IMS network without having to use a third party or surrogate registration method. Embodiments of the present invention have several practical applications in the technical arts including allowing a service operator to redirect calls intended for an unregistered endpoint within an enterprise before the call enters the enterprise, using the current network system infrastructure.

In a first illustrative aspect, a set of computer-useable instructions provide a method of initiating a routine to deregister an endpoint; deregistering the endpoint in the IMS network; and storing the registration status of the endpoint in the IMS network.

In a second illustrative aspect, a system provides presence based routing where the system comprises an application server initiating a deregistration routine to deregister an endpoint and storing the registration status of the endpoint; a feature server storing forwarding data for the user, where the forwarding data comprises a second endpoint; and a rules engine processing the registration status of the endpoint and accessing the forwarding data in the feature server, where the application server routes the call to the second endpoint.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Acronyms and Shorthand Notations

Figure 1:
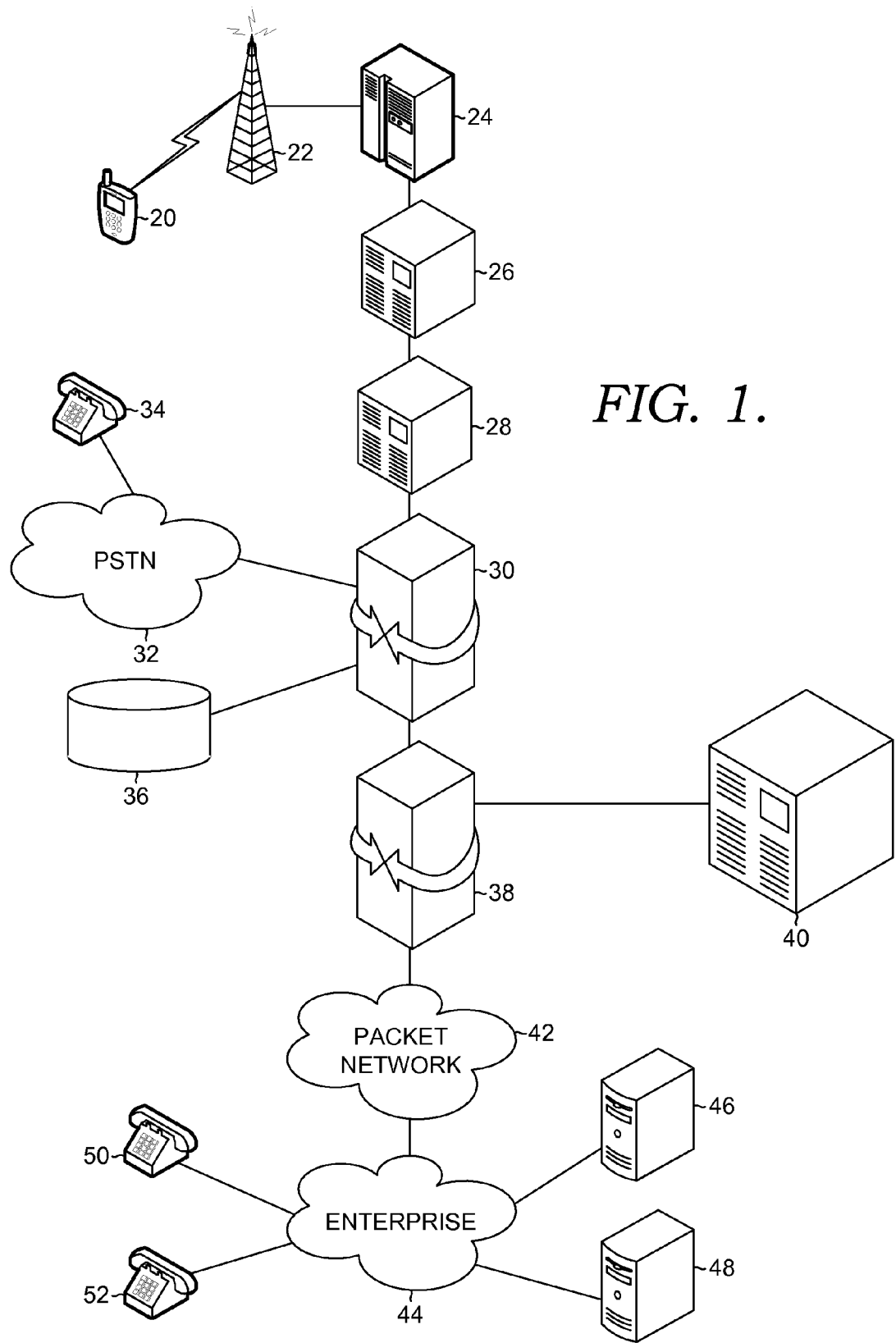
FIG. 1 is a block diagram of a computing system environment suitable for use in implementing embodiments of the present invention.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| BSC | Base Station Controller |
| BTS | Base Transceiver Station |
| CATV | Cable TV |
| CD-ROM | Compact Disk Read Only Memory |
| DVD | Digital Versatile Discs |
| EEPROM | Electrically Erasable Programmable Read Only |
| HLR | Home Location Register |
| IMS | IP Multimedia Subsystem |
| IP | Internet Protocol |
| IPPBX | Private Branch Exchange |
| MSC | Mobile Switching Center |
| PSTN | Public Switched Telephone Network |
| RAM | Random Access Memory |
| ROM | Read Only Memory |
| SIP | Session Initiation Protocol |
| TDM | Time-Division Multiplexing |
| VoIP | Voice over Internet Protocol |
| VoP | Voice over Packet |

Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 is a diagram of an exemplary telecommunications network. The exemplary telecommunications network includes an exemplary IP Multimedia Subsystem network 38. In some embodiments, the IMS network may also include a separate application server 40. The IP Multimedia Subsystem network 38 is in communication with packet network 42 and softswitch 30.

An IMS is an architectural framework for telecommunications operators for providing mobile, fixed multimedia, and other services. It will be appreciated that the IMS may be a combination of a general access network, softswitches, and session initiation protocol (SIP). In particular, IMS supports Voice-over-Internet Protocol (VoIP) based on standardized session initiation protocol over Internet Protocol (IP). IP is a data-oriented protocol used for communicating data across a packet-switched network 42. VoIP is the routing of voice conversations over the internet or through any other IP-based network. SIP or session initiation protocol is an application layer control protocol for creating, modifying, and terminating sessions with one or more users, where sessions include internet telephone calls, multimedia distribution, and the like. A session between two IMS networks, between an IMS network and a user on the internet, and between two users on the internet may be established using IP.

The IMS network 38 may be accessed directly by endpoints or may be accessed via enterprises and gateways. Endpoints may be any variety of devices including computers, personal data assistants, telephones, desksets, mobile phones, and the like. Endpoints generating a packet-based transmission may include computers, personal data assistants, telephones, desksets within an enterprise (such as desksets 50 and 52), and mobile phones. Packet-based transmissions may be any packet-based data including voice calls, instant messages, and video. Endpoints utilizing non-packet based transmissions, such as telephones within a circuit-switched network or the public switched telephone network (PSTN) and mobile calls within a circuit-switched network. The PSTN 32 is the network of the world's public circuit-switched telephone networks.

Within an IMS network 38, multimedia data, such as audio, video and instant messages, is sent over the network to a targeted endpoint, specifically a SIP endpoint. A target endpoint may be any IP compatible device, such as a computer, a deskset, and the like. The network uses this endpoint to direct the multimedia to the appropriate recipient.

Application server 40 provides logic to direct the call as it leaves the IMS network 38 before it enters the packet switched network 42. The application server 40 may reside as a stand-alone server, within the IMS network 38 or may be incorporated into an IPPBX server, such as IPPBX server 46.

A call or data transmission may be placed into an IMS network 38 from an endpoint within the IMS network, from a mobile phone or from a circuit bases telephone. For example, a call or data transmission from mobile phone 20 is placed on the service provider's network to the deskset 50. In one embodiment, the call or data transmission reaches the IMS network 38 by passing through the cell tower 22, the base transceiver station 24, the base station controller 26, the mobile switching center 28, and then the softswitch 30. A base transceiver station 24 is the equipment which facilitates the wireless communication between user equipments and the network. A base station controller 26 is responsible for handling traffic and signaling between the mobile phone and the base transceiver station. The mobile switching station 28 carries out the switching functions, and the softswitch 30 connects the call to other mobile phones or to the PSTN 32. A home location register (HLR) 36 is also connected to the softswitch 30 as a central database that contains details of each phone subscriber that is authorized to use the network. It will be appreciated that the mobile telecommunications network of FIG. 1 is exemplary and any variety of mobile telecommunications systems may be utilized. In another example, a call from telephone 34 is placed to the deskset 50 and travels through the PSTN 32 and a gateway to the IMS network 38.

Continuing the above example, before the call or data transmission is sent to the enterprise 44 for deskset 50, the application server 40 of the IMS network 38 processes the call or data transmission. After the call is processed by the application server 40 of the IMS network 38, it is transmitted via the packet network 42 to enterprise 44 to be routed to deskset 50.

Enterprise 44 is an internal network that serves, for instance, a business, made up of extensions and trunk lines to connect desksets (such as desksets 50 and 52) within the enterprise 44 and to connect the enterprise 44 with packet-switched network 42. Internally, an enterprise 44 may utilize an IPPBX (private branch exchange) 46 or other server for routing calls or data transmissions. An IPPBX 46 is a server that receives calls from outside the enterprise over the trunk lines and subsequently routes the calls to the appropriate extension based on the IP endpoint of the call.

Within the enterprise 44, each endpoint (such as desksets 50 and 52) registers locally within the enterprise. Thus, if the enterprise 44 has an IPPBX 46, the IPPBX 46 will store the registration status of the endpoints in the enterprise 44. If the user is away from his deskset (such as desksets 50 and 52) and the endpoint is unregistered, the IPPBX 46 will be aware of the endpoint's registration status and will route the call or transmission based on a default procedure. For example, a telephone call could be sent from the IPPBX 46 to the user's voicemail 48, to terminate the call.

Currently, within enterprise 44, calls may be forwarded from desksets within enterprise 44 to other desksets within enterprise 44 (such as from deskset 50 to deskset 52 and vice versa). However, it is not desirable for the IPPBX 46 of the enterprise 44 to forward calls outside of enterprise 44. One of ordinary skill in the art would appreciate that requiring the IPPBX 46 to receive a call from the IMS network 38 and to then send the call back into the IMS network 38 consumes network access bandwidth.

Embodiments of the present invention allow endpoints within an enterprise 44 to communicate directly with an application server 40 within the IMS network 38 to deregister and forward calls outside of the enterprise 44. Previously, the application server 40 identified all endpoints in an enterprise 44 as always being registered. Typically, only a server within the enterprise 44, such as the IPPBX, is aware of the status of endpoints. Thus, if a user logs off his deskset, the endpoint is unregistered with the IPPBX 46. A call to that endpoint 50 would be sent into the enterprise 44, the IPPBX 46 of the enterprise would identify that the call was to an unregistered endpoint 50, and the IPPBX 46 would perform a default procedure, such as redirecting the call to the user's voicemail 48.

For example, if the user of deskset 50 wants to receive calls at his home telephone, for instance telephone 34, the user of deskset 50 dials an access code directly to application server 40 of the IMS 38. Each endpoint, such as deskset 50 communicates its registration status directly to application server 40 within the IMS 38. The application server 40, based on the source number of the deskset (for example from caller ID) and other codes, such as access codes, is aware of the status of the endpoint. For example, the application server 40 runs a deregistration routine when it receives the user's request to logoff and documents any call forwarding numbers. Thus, when a call or data transmission is received for deskset 50 by the IMS network 38, the application server 40 knows the status of the endpoint and whether calls are to be forwarded outside of the enterprise 44.

Figures 4, 5:
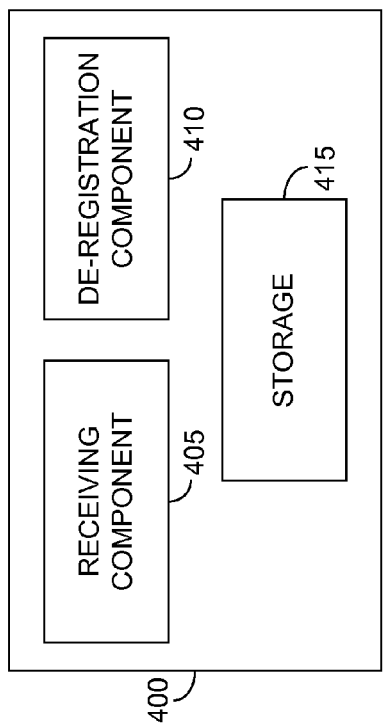
FIG. 4 is a block diagram of a system for deregistering an endpoint from an IMS network in accordance with an embodiment of the present invention.
FIG. 5 is an exemplary storage table for deregistering an endpoint from an IMS network in accordance with an embodiment of the present invention.

Referring now to FIG. 4, a block diagram is provided illustrating an exemplary system 400 to deregister an endpoint from an IMS network in accordance with an embodiment of the present invention. The system 400 may be part of a comprehensive telecommunications system similar to the exemplary system discussed above with reference to FIG. 1.

The system 400 is generally configured to provide deregistration of endpoints with an IMS network. One would appreciate that the system 400 may be configured on an application server, or on multiple application servers. As shown in FIG. 4, the system 400 may include a receiving component 405 to receive deregistration requests from endpoints. The system 400 may further include a deregistration component 410 which performs the method of deregistering an endpoint (which will be described in further detail below). Another component of the system 400 is a storage component that can be used to store the deregistration status of an endpoint.

Figure 2:
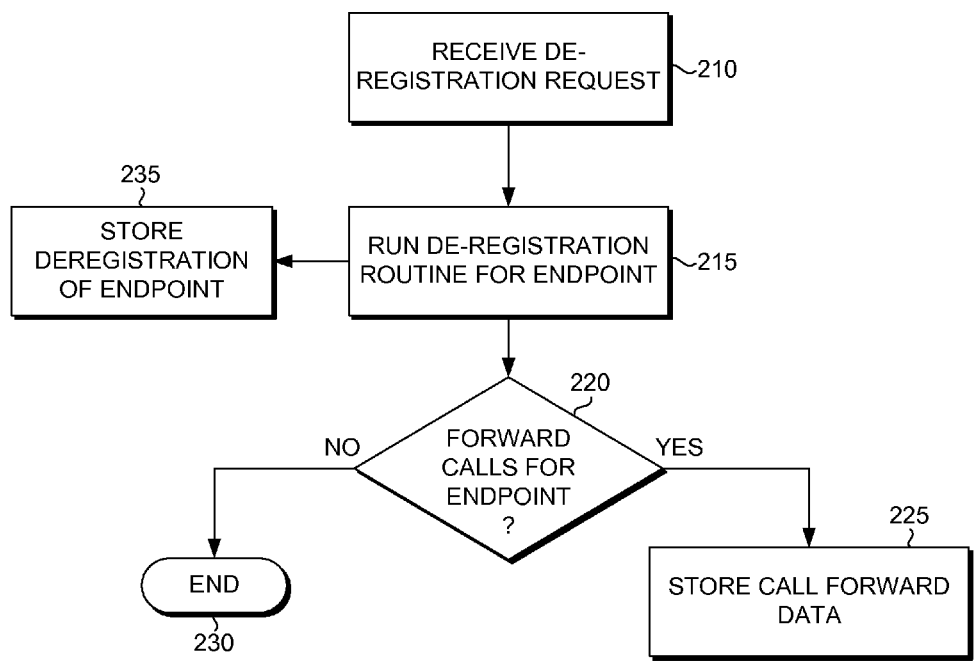
FIG. 2 is a flowchart of a method for deregistering an endpoint from an IP Multimedia Subsystem (IMS) network in accordance with an embodiment of the present invention.

FIG. 2 is a flowchart of a method for deregistering an endpoint from an IMS network in accordance with the present invention. Beginning with step 210, the application server receives a deregistration request from the deskset with the deskset's source code (such as, caller ID) and registration status. Next, the application server runs a deregistration routine in step 215 to designate the endpoint (deskset) as unregistered. The application server stores the deregistration of the endpoint at step 235. After running the deregistration routine, the application server, in step 220, determines whether the user has requested that future calls be forwarded to a number outside the enterprise. The user can make this request by dialing another access code with forwarding information (a different endpoint) on the deskset itself or through a website. It will be appreciated that the deregistration and call forwarding information may be entered in and communicated to the application in any variety of ways.

The application server stores the call forwarding data at step 225. It will be appreciated that the call forwarding data may be stored in any variety of manners including on a feature server with the application server, on the application server or any other data store. In one embodiment, the application server stores the registration status of the IP endpoints, and a feature server stores any forwarding data provided by the user. If forwarding data is not provided the process ends at step 230.

FIG. 5 is an exemplary storage table for deregistering an endpoint from an IMS network in accordance with an embodiment of the present invention. The table shown in FIG. 5 exhibits a database stored within the application server where the application server stores the endpoint location under the SIP header column, the registration status of each endpoint, and forwarding information, if such information is included. It will be appreciated that the storage table of FIG. 5 is merely exemplary and that the deregistration information and the call forwarding information for endpoints may be stored on multiple servers and in multiple databases and table.

Figure 3:
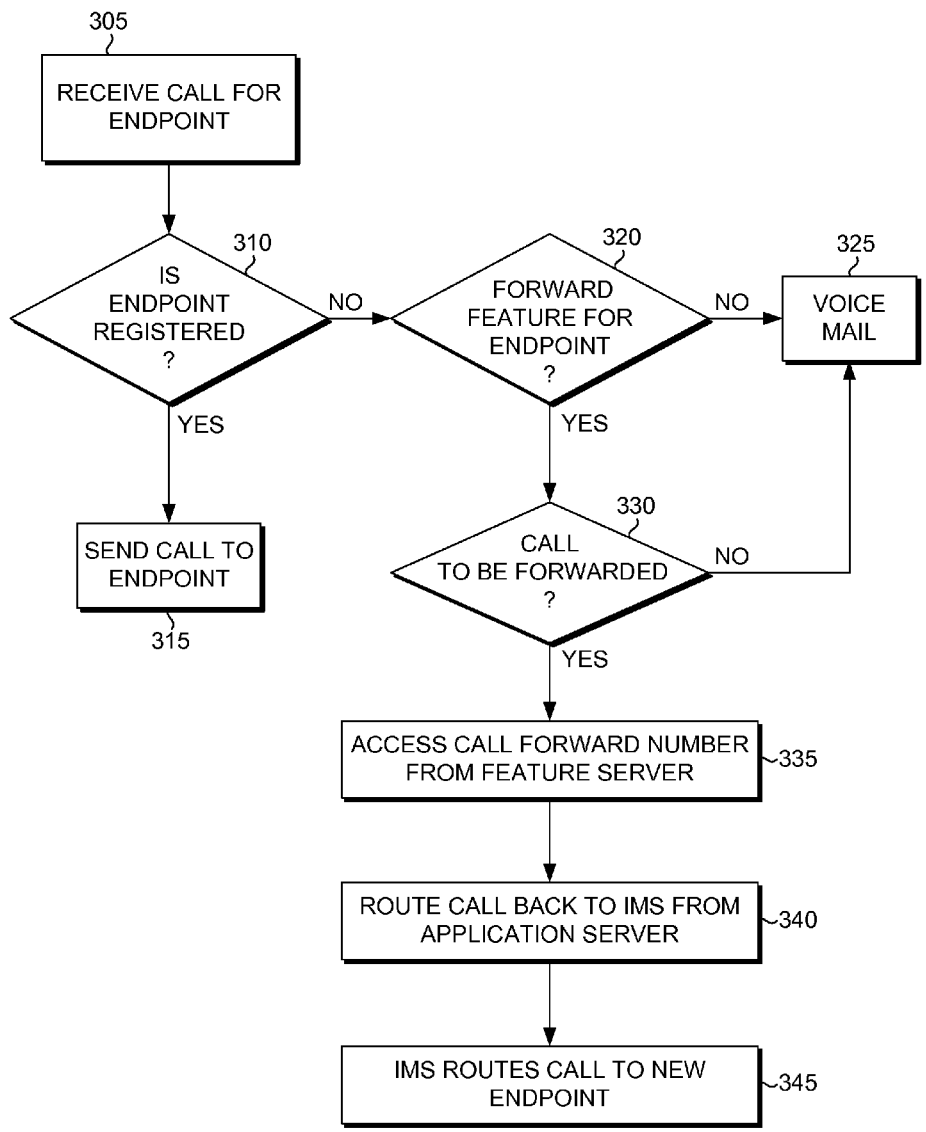
FIG. 3 is a flow diagram of a method for determining whether an endpoint is registered with the IMS network in a accordance with an embodiment of the present invention.

Referring now to FIG. 3, a flow diagram is provided of a method for determining whether an endpoint is registered with the IMS network. At step 305, the IMS network receives a call directed to the user's designated IP endpoint within the enterprise. The application server provides the logic needed to, if necessary, redirect the call by first identifying the registration status of the specific endpoint. At step 310, the application server determines whether the endpoint is registered or unregistered. If the endpoint is registered, at step 315 the application server will have the call sent through the packet switched network into the enterprise as the call would normally be processed.

If the application server determines the endpoint is unregistered, the application server then proceeds to step 320 determines the services paid for by the user. For example, the application server must determine whether the user's service allows for call forwarding before forwarding any calls (e.g., if the user has paid for the call forwarding feature). If not, regardless of whether the user has requested that calls be forwarded, the call will be sent to the enterprise at step 325. The IPPBX within the enterprise will direct the call to the appropriate location. Assuming the user has logged off of his deskset, the IPPBX will again follow a default procedure for calls to an unregistered endpoint, for example, by routing the call to the user's voicemail since the IPPBX within the enterprise will be aware of the endpoint's unregistered status.

At step 330, if the user has paid for the call forwarding feature, the application server uses its rules engine to determine whether the user has previously provided any forwarding data. If the user's endpoint is unregistered but no forwarding data is found, the application server will perform a default procedure, such as sending the call to the enterprise, and the IPPBX within the enterprise will direct the call to a default location at step 325. As mentioned above, since an IPPBX within an enterprise would know the registration status of the endpoint, the IPPBX may direct the call to the user's voicemail. If the user has requested calls to be forwarded, the application server will engage the rules engine to access the endpoint to which the call should be forwarded at step 335. For example, a table or database within the call forward number, such as the one shown in FIG. 5, may be accessed. At step 340, the application server routes the call back into the IMS network via a SIP message with the alternate endpoint and forwards the call to the requested call forward number. In one embodiment, the IMS network sends the call back to the softswitch in order to route the call to the alternate enterprise. The softswitch then sends the call through the PSTN to the alternate endpoint at, for example, the user's home and thus terminates the call to the PSTN.

Within the application server, deregistration occurs first when the application server updates its registration data so that the endpoint's presence status is correct and current. The application server next initiates the rules engine to check the rules, specifically the subscriber or profile data within the feature server. This data tells the application server what services it should provide to that user, such as call forwarding. If forwarding is a service available to the user, the application server will then check for forwarding data that has been received directly from the user and stored in the application server, either through the deskset if the user has entered the data there, or through other methods such as through a specified website. Once this occurs, assuming there is forwarding data available, the application server goes to its underlying protocol stack and formats a SIP message to communicate back to the IMS network. The SIP message, because it can communicate textual messages, contains the appropriate forwarding information in its header to communicate the alternate endpoint to the IMS network.

This method saves the enterprise bandwidth by allowing the operating service provider to reroute the call before it enters the enterprise's network. Otherwise, bandwidth of the enterprise would be consumed by receiving the call from the IMS network and then sending the call back to the IMS network.

In another embodiment of the invention, a method can be used when sending other multimedia data over an IMS network, as mentioned above. The application server in the IMS network can access the profile of the endpoints to determine the multimedia capability of each endpoint within the enterprise. For example, video data takes up a large amount of bandwidth, but currently, if video is sent to an endpoint and that endpoint does not have video capability, an attempt would still be made to send the data through the enterprise to the designated endpoint.

Referring back to FIG. 1, an example of this occurs when users within an enterprise (such as users utilizing desksets 50 and 52) participate in a video conferencing session with another user outside of the enterprise (such as phone 34). Specifically, a user is located at phone 34 located outside of the enterprise of either deskset 50 or 52. The user of phone 34 proceeds to send both audio and video data to users at desksets 50 and 52. If deskset 50 has video capability, then deskset 50 will receive both the audio and video data, and be able to fully engage in the video conference with the user at phone 34. Assuming, for example that deskset 52 does not have video capability, it will still be sent both the video and audio data, but will, of course, only be able to receive and access the audio portion of the conference. The video data will still enter the enterprise 44 in an attempt to reach the endpoint at deskset 52 and consume valuable bandwidth because each data stream has a separate IP endpoint, and the application server 40 of the IMS network 38, by itself, does not recognize which endpoints exist so all streams are sent into the enterprise 44. Currently, that determination is not made until the data reaches the IPPBX 46 of the enterprise, at which point it is too late to block the video stream from being sent to enterprise 44.

This embodiment recognizes the available endpoints of the users and routes only the multimedia data that will successfully reach the user. The IMS network is able to make this recognition in a similar method as that described above in regards to the first embodiment. In this embodiment, the application server would look up the multimedia capability of each endpoint by accessing the profile in a database. The capabilities of the endpoints would be stored in the database with a unique identifier associated to each endpoint.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-storage media having computer-useable instructions embodied thereon for performing a method for providing presence based routing in an IP Multimedia Subsystem (IMS) network, the method comprising:
   receiving a request at an application server within the IMS network from a first endpoint in an enterprise network to deregister the first endpoint, wherein deregistering the first endpoint indicates to the IMS network that the first endpoint is no longer registered with the enterprise network, wherein the enterprise network utilizes a private branch exchange to route calls from the IMS network to endpoints within the enterprise network, and wherein the application server provides logic to process and direct calls as the calls leave the (IMS) network;
   within the IMS network, receiving forwarding data from the first endpoint, wherein the forwarding data indicates a second endpoint outside of the enterprise network to which future calls to the first endpoint are to be forwarded while the first endpoint is unregistered and until the first endpoint is registered with the (IMS) network;
   deregistering the first endpoint within the (IMS) network; and
   storing the deregistration of the first endpoint and the forwarding data in the (IMS) network.

2. The method of claim 1, wherein the deregistering step is performed by an application server in the (IMS) network.

3. The method of claim 1, further comprising receiving a dialed access code from the endpoint.

4. The method of claim 1, wherein the enterprise is located outside of the (IMS) network.

5. The method of claim 1, wherein the endpoint is one of a telephone, personal data assistant, computer or combination thereof.

6. One or more computer-storage media having computer-useable instructions embodied thereon for performing a method in an IP Multimedia Subsystem (IMS) network for routing a call to a second endpoint, the method comprising:
   within the IMS network, receiving a call or data transmission for a first endpoint that is associated with an enterprise network, wherein the call or the data transmission is received from a source endpoint that is associated with a different network than the first endpoint, wherein the first endpoint is within an enterprise network that utilizes a private branch exchange to route calls from the IMS network to endpoints within the enterprise network;
   at an application server, determining whether the first endpoint is registered or deregistered within the IMS network, wherein the determination as to whether the first endpoint is registered or deregistered is made prior to when the call or data transmission is routed to the enterprise network for delivery to the first endpoint;

determining whether the call or data transmission should be forwarded to a second endpoint outside of the enterprise network, without sending the call or data transmission to the enterprise network, when the first endpoint is deregistered with the IMS network; and when it is determined that the call or data transmission should be forwarded to the second endpoint when the first endpoint is deregistered, then routing the call or data transmission to the second endpoint while the first endpoint is deregistered.

7. The method of claim 6, wherein the enterprise is located outside of the IMS.

8. The method of claim 6, wherein the first endpoint is one of a telephone, personal data assistant, computer or combination thereof.

9. The method of claim 6, wherein the second endpoint is one of a mobile phone, a telephone in a public switched telephone network or a deskset located in a second enterprise.

10. The method of claim 6, wherein the data transmission is one of a video or instant message.

11. The method of claim 6, wherein the call or data transmission originated from the source endpoint.

12. The method of claim 11, wherein the source endpoint is one of a mobile phone, a telephone in public switched telephone network or a deskset located in a second enterprise.

13. A system in an IP Multimedia Subsystem (IMS) network for providing presence based routing, the system comprising:

one or more application servers in the IMS network for initiating a deregistration routine to deregister a first endpoint upon receiving a deregistration request for the first endpoint, wherein the deregistration request includes a source code associated with the first endpoint and a current deregistration status, wherein the first endpoint is within an enterprise network, and wherein deregistering the first endpoint indicates to the IMS network that the first endpoint is no longer registered with the enterprise network;

one or more feature servers for receiving call forwarding data for the first endpoint, wherein the forwarding data indicates a second endpoint outside of the enterprise network to which future calls to the first endpoint are to be routed while the first endpoint is unregistered and until the first endpoint is registered with the IMS network; and one or more data stores for storing the deregistration of the first endpoint and the call forwarding data for the first endpoint.

14. The system of claim 13, wherein the enterprise is located outside of the IMS.

15. The system of claim 13, wherein the first endpoint is one of a telephone, personal data assistant, computer or combination thereof.

* * * * *